July 11, 1950  G. M. MIERLEY  2,514,408
GAS TURBINE APPARATUS
Filed April 19, 1948
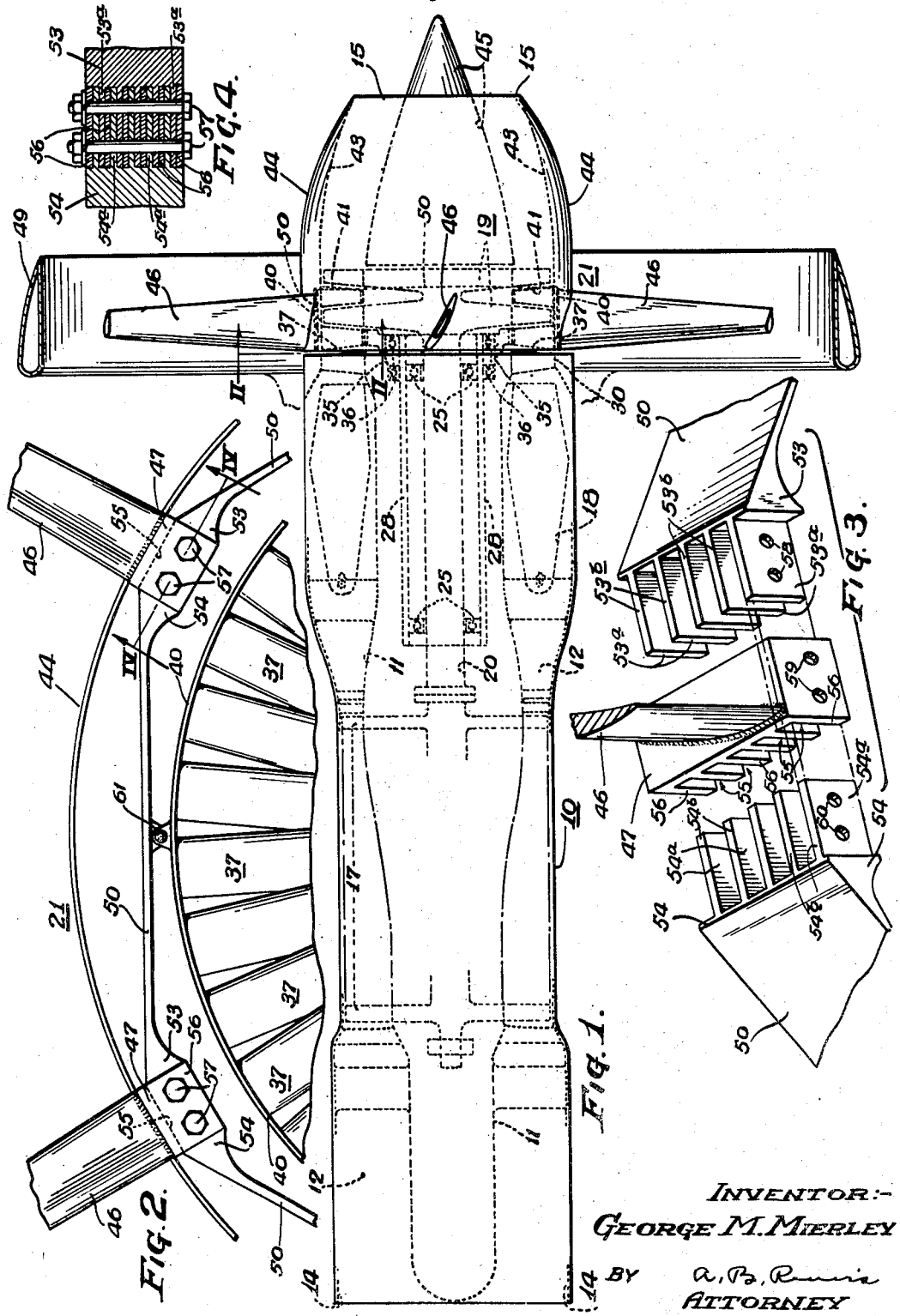
INVENTOR:-
GEORGE M. MIERLEY
BY
ATTORNEY Patented July 11, 1950

2,514,408

UNITED STATES PATENT OFFICE 2,514,408

GAS TURBINE APPARATUS

George M. Mierley, Havertown, Pa., assignor to Westinghouse Electric Corporation, East Pittsburgh, Pa., a corporation of Pennsylvania Application April 19, 1948, Serial No. 21,989

5 Claims. (Cl. 170—135.7)

This invention relates to gas turbine power plants for propelling aircraft, particularly to a gas turbine engine equipped with a turbine driven propeller, and has for an object the provision of an improved apparatus of the class described.

In Patent No. 2,478,206 of Arnold H. Redding, assigned to the assignee of the present application, there is disclosed an aviation gas turbine power plant having coaxial low and high speed turbine rotors which are operative by motive fluid delivered under pressure from a combustion apparatus for separately driving a compressor and a ducted propeller. In that disclosure, the propeller blades are mounted on the annular shroud surrounding the blading of one of the turbines, the entire rotor assembly being journaled independently of the companion turbine, which is operative in the opposite direction to drive the usual compressor of the power plant.

It is an object of the present invention to provide a gas turbine power plant having a construction generally similar to that disclosed in the aforementioned patent application, in which the propeller assembly is provided with a novel mounting including tension members for absorbing radial or centrifugal forces to which the propeller blades are subjected during operation, so that only torque and thrust forces can be imposed on the supporting turbine blading and shrouding.

Another object of the invention is the provision of a combination turbine and propeller rotor aggregate including a framework of interlocked tension members for securing the propeller blades against radial forces without transmitting such forces to the supporting turbine blading.

A further object of the invention is the provision of a unitary propeller and turbine assembly having the aforesaid features of construction, in which each of the flat tension members carries enlarged ends having a plurality of tongues, the tongues of each pair of abutting tension members being interlocked with complementary tongues formed on the adjacent propeller blade for rigidly securing the parts together.

These and other objects are effected by the invention as will be apparent from the following description and claims taken in connection with the accompanying drawings, forming a part of this application, in which:

Fig. 1 in a diagrammatic elevational view of an aviation gas turbine power plant having a ducted propeller assembly constructed in accordance with a preferred form of the invention;

Fig. 2 is a fragmentary enlarged-detail sectional view taken substantially along the line II—II of Fig. 1;

Fig. 3 is a fragmentary exploded view of two tension members and a cooperating propeller illustrating the manner of assembling the same; and Fig. 4 is a fragmentary sectional view taken along the line IV—IV of Fig. 2.

Referring to Fig. 1 of the drawing, the gas turbine power plant therein illustrated in diagrammatic form is one of the directly connected propeller type with which the invention may advantageously be associated. As shown in this figure, the power plant comprises a streamlined outer casing structure 10 in which may be mounted a sectional inner casing structure 11 providing an annular flow passage 12, which constitutes a through communication extending from a forwardly directed air intake opening 14 to a rearwardly directed discharge or jet nozzle 15. The outer casing structure 10 is adapted to be mounted in or on the fuselage or wing of an aircraft in any suitable manner, and houses the operating elements of the engine which are arranged in line so as to present minimum frontal area, thus minimizing drag during operation of the aircraft. The operating elements of the gas turbine power plant include an axial flow compressor 17, an annular fuel combustion apparatus 18, a two-stage turbine 19 operatively connected to the rotor of the compressor 17 through the medium of a shaft 20, and an auxiliary turbine and propeller aggregate indicated generally by the reference character 21, which is adapted to be driven independently of the turbine 19, as hereinafter explained. The shaft 20 may be journaled on bearings 25 carried in a cylindrical member 28 forming part of the casing 11.

In accordance with the well-known principle of operation of a gas turbine power plant, air entering the inlet opening 14 is compressed by the compressor 17 and delivered to the combustion apparatus 18 to support combustion of fuel therein, and the resultant heated motive fluid flowing from the combustion apparatus is then expanded past the turbine 19 for driving the compressor 17, and past the adjacent turbine blading for driving the turbine and propeller aggregate 21, finally issuing through the nozzle 15 in the form of a jet establishing a propulsive thrust.

According to the invention, the auxiliary turbine and propeller aggregate 21 comprises an annular rotor member or hub 35 which is journaled on bearings 36 supported on the outer surface of the cylindrical member 28, and a plurality of radially disposed turbine blades 37 which are interposed between the stationary blades of the diaphragm 30 and the first stage of turbine blades of the turbine 19. It will be understood that any desired blade root construction may be employed for securing the turbine blades 37 to the hub 35.

Secured to the peripheral or outer portions of the turbine blades 37 is an annular shroud 40, which extends rearwardly and carries a second stage of blades 41 that are interposed between the oppositely rotative blade rows of the turbine 19. Also extending rearwardly from the annular shroud 40 is the tapered inner wall section 43 of a rotary tailpiece of the power plant, other elements of this assembly including an outer section 44 and a centrally disposed core member 45 supported within the inner wall 43 through the medium of radially disposed struts (not shown). It will be understood that with this construction, the turbine 19, shroud 40, section 43 and core member 45 constitute a unitary rotary assemblage.

The annular shroud 40 is also adapted to support a plurality of radially arranged propeller blades 46, each of which has a base or root portion 47 adapted to extend, through a suitable aperture formed in the outer wall 44, into close proximity to the shroud 40, as shown in Fig. 2. The outer ends of the propeller blades 47 terminate closely adjacent an annular duct or shroud 49 (see Fig. 1), which may be suitably supported in concentric relation to the casing structure 10 by suitable struts (not shown).

According to the present invention, the base portions 47 of the blades 46 are interlocked and supported by means of a polygonal framework comprising a plurality of flat tension members 50. Abutting ends of adjacent tension members 50 are adapted to be secured together by means of interlocking portions forming a rigid joint that serves to transmit to the assembled framework of tension members substantially all radial or centrifugal forces acting on the propeller blades. As best shown in Fig. 3, the respective tension members 50 have formed thereon enlarged opposite end portions 53 and 54, each end portion 53 being complementary to an end portion 54 of the tension member which is mounted adjacent thereto when the several elements are assembled to constitute a framework encompassing the turbine blading 37 (see Fig. 2). A plurality of spaced parallel tongues 54a are formed on each of the ends 54 and are arranged for interdigitation with similar but suitably offset tongues 53a carried on each of the complementary ends 53 of the tension members 50, so that when the members are assembled the opposite side surfaces thereof will be flush or in the same planes. The respective tongues 53a and 54a are disposed far enough apart to effect overlapping engagement thereof in spaced pairs, as may be seen in Fig. 4 of the drawing. It will be understood that the angle at which the tongues project from the end portions 53 and 54 will be determined by the number of tension members provided for supporting the radially disposed blades 46.

The enlarged base portion 47 of each propeller blade is relatively flat and is disposed normal to the blade axis. A plurality of slots 55 forming spaced tongues 56 are formed in each base portion 47, as shown in Fig. 3. These tongues are adapted to be interposed in interleaved relation between the associated pairs of tongues 53a and 54a of the tension members 50. The joint thus formed, as illustrated in Fig. 4, provides a rigid mounting for the associated blade, which is secured in place by means of transversely disposed bolts 57 that extend through suitable registering apertures 58, 59 and 60 formed in the respective groups of tongues (see Fig. 3).

It will be apparent that each blade 46 will be held against any tendency toward slight relative shifting or rocking with respect to the adjacent tension members 50 inasmuch as the slots 54 are formed with flat inner walls adapted for close engagement with flat outer faces 53b and 54b formed in the tongues 53a and 54a.

As shown in Fig. 2 the assembled propeller blades 46 and tension members 50 are thus adapted to constitute a substantially polygonal framework or web surrounding the shroud 40 and turbine blading 37. The shroud 40 is readily connected to the respective tension members 50 intermediate the ends thereof by suitable pins 61, which constitute the driving connection between the turbine and propeller blades. During rotation of the turbine and propeller aggregate 21, therefore, only torque and thrust forces of the propeller blades 46 can be transmitted to the turbine shroud 40, while all radial or centrifugal forces are absorbed by the tension members 50.

It will be understood that the application to the turbine and propeller aggregate 21 of the improved propeller blade supporting means, including the tension members 50, will not necessitate any substantial alteration in the dimensions or construction of the turbine rotor assembly employed with such apparatus, since each of the tension members is adapted to be contained entirely within the space defined between the turbine shroud 40 and the outer wall 44 of the tail section of the power plant.

While the invention has been shown in but one form, it will be obvious to those skilled in the art that it is not so limited, but is susceptible of various changes and modifications without departing from the spirit thereof.

What is claimed is:

1. Aircraft propulsion apparatus comprising a casing structure, a rotor mounted in said casing structure, a plurality of radially extending propeller blades having base portions, a plurality of tension members interposed between the base portions of said blades, each of said tension members being substantially tangentially aligned with relation to said rotor, means connecting said rotor and each tension member intermediate the ends thereof, and means for securing the base portion of each blade between the abutting ends of the adjacent tension members, including a plurality of cooperating tongues formed on each of said ends, and a plurality of radial slots formed in said base portion of each corresponding blade for receiving said tongues in interleaved relation.

2. Aircraft propulsion apparatus comprising a casing structure, a rotor mounted in said casing structure, a plurality of radially extending propeller blades having base portions, a plurality of tension members interposed between the base portions of said blades, means connecting said rotor and each tension member intermediate the ends thereof, each of said tension members being substantially tangentially aligned with relation to said rotor, and means for securing the base portion of each blade between the abutting ends of the adjacent tension members, including a plurality of cooperating tongues formed on each of said ends, a plurality of radial slots formed in said base portion of each corresponding blade for receiving said tongues in interleaved relation, and bolts extending through registering apertures formed in said tongues and in said base portion.

3. Propeller apparatus mounted on the peripheral portion of a turbine rotor, comprising a polygonal framework encompassing said rotor and including a plurality of substantially straight interlocking tension members pivotally connected to said peripheral portion of the rotor and having enlarged ends, each of said ends having formed thereon a plurality of parallel tongues, the tongues on one end of the member complementing and overlapping the similar tongues on the end of the adjacent tension member, and a plurality of radially disposed propeller blades having base portions on which are formed spaced tongues adapted to be secured in interleaved relation with said interlocking tongues of said tension members, whereby said tension members are adapted to absorb radial forces on said blades while said turbine rotor is subject only to thrust and torque forces.

4. Propeller apparatus mounted on the peripheral portion of a turbine rotor, comprising a polygonal framework incorporating said rotor and including a plurality of substantially straight interlocking tension members having enlarged ends, the engaging ends of said tension members having formed thereon complementary tongues arranged in spaced overlapping pairs, a plurality of propeller blades having parallel tongues interposed in interleaved relation between said pairs of tongues of said tension members, and means for interlocking said engaged tongues together.

5. Propeller apparatus mounted on the peripheral portion of a turbine rotor, comprising a polygonal web incorporating said rotor and including a plurality of substantially straight interlocking tension members having enlarged ends, the engaging ends of said tension members having formed thereon complementary tongues arranged in spaced overlapping pairs, a plurality of propeller blades having parallel tongues interposed in interleaved relation between said pairs of tongues of said tension members, said engaged tongues having registering apertures formed therein, and transversely disposed bolts secured in said apertures for clamping said elements together.

GEORGE M. MIERLEY.

REFERENCES CITED

The following references are of record in the file of this patent:

UNITED STATES PATENTS

| Number | Name | Date |
|---|---|---|
| 2,410,804 | Bauman | Nov. 12, 1946 |

FOREIGN PATENTS

| Number | Country | Date |
|---|---|---|
| 587,528 | Great Britain | Apr. 29, 1947 |